United States Patent [19]

Dawson et al.

[11] Patent Number: 4,706,772
[45] Date of Patent: Nov. 17, 1987

[54] OSCILLATING SCANNER ARRANGEMENT

[75] Inventors: Ian J. Dawson, Mentor; Robert L. McNutt, Painesville, both of Ohio

[73] Assignee: Caterpillar Industrial Inc., Mentor, Ohio

[21] Appl. No.: 853,829

[22] Filed: Apr. 21, 1986

[51] Int. Cl.[4] .............................................. B60T 7/16
[52] U.S. Cl. ...................................... 180/167; 74/96; 250/221
[58] Field of Search ....................... 180/167, 168, 169; 250/221; 350/6.1; 74/42, 96, 105; 356/1, 4

[56] References Cited

U.S. PATENT DOCUMENTS

| 3,307,583 | 3/1967 | Harter | 74/96 |
| 3,352,167 | 11/1967 | Winters | 74/96 |
| 3,713,346 | 1/1973 | Chamberlain et al. | 74/42 |
| 3,851,351 | 12/1974 | Pickles et al. | 15/250.25 |
| 3,992,623 | 11/1976 | Rhyins et al. | 250/216 |
| 4,307,791 | 12/1981 | De Bruine | 180/168 |
| 4,345,662 | 8/1982 | Deplante | 180/168 |
| 4,354,106 | 10/1982 | Walter | 250/221 |
| 4,623,032 | 11/1986 | Kemmer | 180/169 |

FOREIGN PATENT DOCUMENTS 1804871 8/1970 Fed. Rep. of Germany .
2504112 8/1975 Fed. Rep. of Germany .
2019809 11/1979 United Kingdom .
2139445 11/1984 United Kingdom .

Primary Examiner—John J. Love
Assistant Examiner—Eric Culbreth
Attorney, Agent, or Firm—Alan J. Hickman

[57] ABSTRACT

Detection systems for identifying an object in the path of a vehicle are affected by external interferences which render them unreliable. An oscillating scanner arrangement having first and second spaced apart transceiver assemblies is mounted on a frame of the work vehicle at spaced apart locations and are each pivotally movable between spaced apart angular positions. First and second devices pivotally connect the first and second transceiver assemblies respectively to the frame, and a power device reciprocally moves the first transceiver assembly between the first and second positions. A tie arrangement connects the first transceiver assembly to the second transceiver assembly and reciprocally moves the second transceiver assembly between the third and fourth positions. Thus, the problems related to external interference are solved in an efficient and economical manner. The oscillating scanner arrangement is particularly suited for use on a material handling vehicle.

13 Claims, 5 Drawing Figures

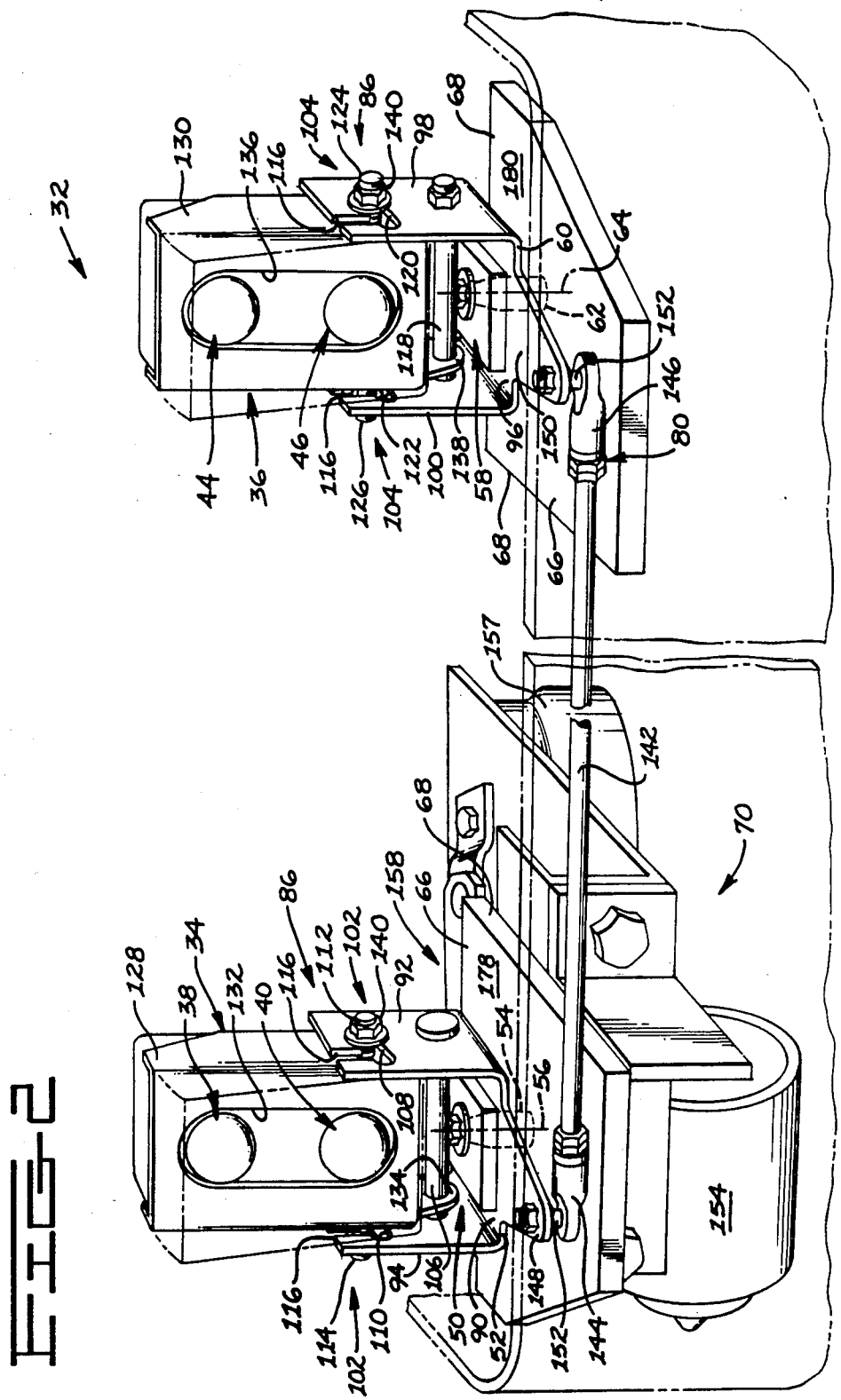

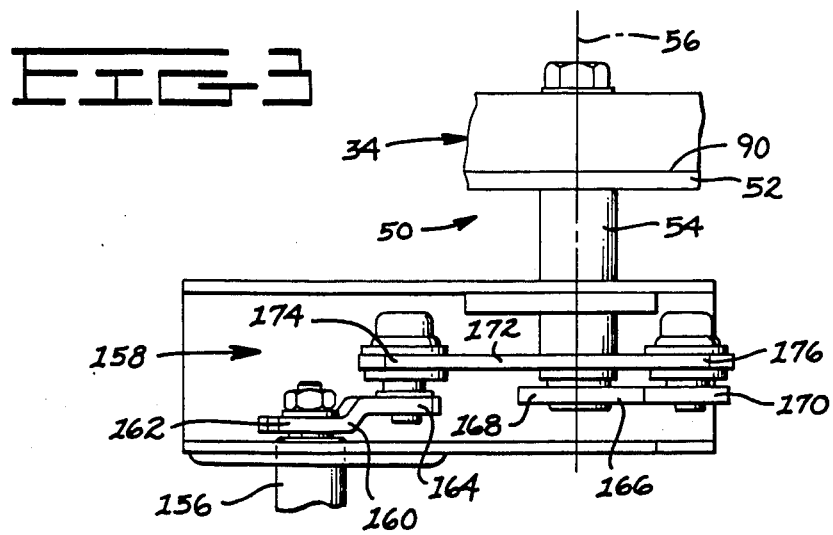
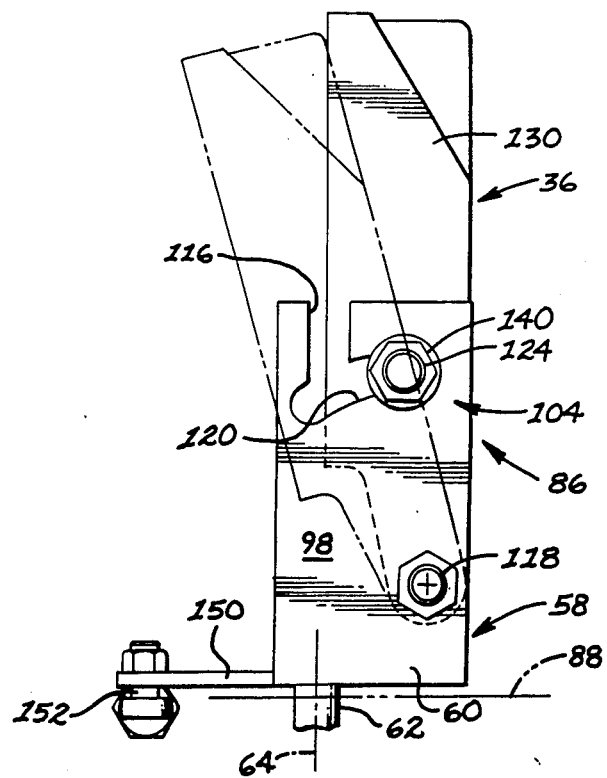

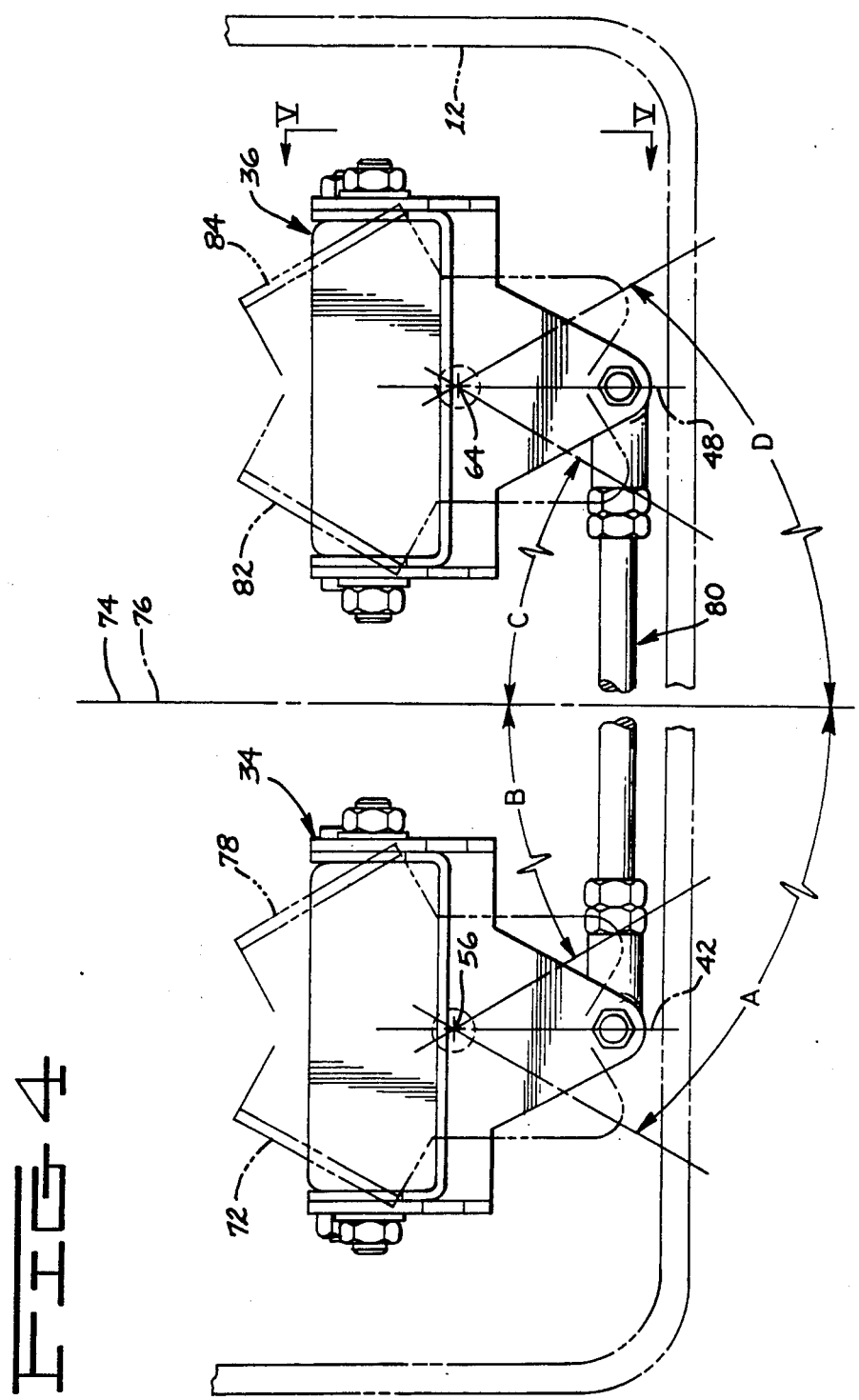

OSCILLATING SCANNER ARRANGEMENT

TECHNICAL FIELD

This invention relates generally to an oscillating scanner arrangement for a vehicle and, more particularly, to an oscillating scanner arrangement having the first transceiver assembly pivotally connected to a material handling vehicle at a first location and a second transceiver assembly pivotally connected to the material handling vehicle at a second location spaced from said first location, and a drive means for reciprocally moving the first and second transceiver assemblies about the first and second axis.

BACKGROUND ART

Work vehicles such as material handling vehicles, for example, lift trucks, platform trucks, AGV's (automatic guided vehicles), and the like are provided for transporting loads between spaced apart locations in factories, warehouses, and the like. Often there are several work vehicles operating within close proximity to one another which makes it necessary to provide a detection system to identify when another vehicle is in its path of travel. This is particularly the case when the vehicle is of the driverless type.

U.S. Pat. No. 4,345,662 dated Aug. 24, 1982 to Michael Deplante depicts an automatic guided vehicle with a radar detector consisting of one or more ultrasonic emitters and one or more ultrasonic receivers for detecting obstacles in the path of the vehicle. These radar detectors are rigidly secured to the vehicle and disperse ultrasonic signals fore and aft of the vehicle. One problem with such a system is that vehicles of this type operate in environments that are often noisy and disruptive to ultrasonic sensors of this type. As a result, false signals received would adversely affect the operation of the vehicle and cause frequent shutdowns of the AGV and adversely affect the overall operation of the workplace.

In order to improve over the reliability of a ultrasonic obstacle detection system, it was envisioned that a light signal response system would overcome the heretofore mentioned problem and provide a reliable and preferable solution to the problem since a light signal response system consisting of a transmitter and receiver would not be influenced by noise or other factory generated signals. This solution appeared to be successful. However, it was found that certain objects did not adequately reflect the light signal back to the receiver due to a weakness in the intensity of the light signal. The option of replacing a single transmitter and receiver with several fixedly mounted transmitters and receivers of a substantially higher intensity and narrow beam width was considered, but found impractical due to space and cost limitations.

It is necessary, therefore, to provide a transceiver arrangement capable of sensing the presence of an object in front of the work vehicle in all potential operating environments and in a simple and low cost manner.

DISCLOSURE OF THE INVENTION

In one aspect of the present invention, a work vehicle having a frame, an end portion, first and second spaced apart sides, and a longitudinal vehicle axis is provided. A first transceiver assembly has a transmitting portion which is adapted to deliver a first light signal having a central axis, and a receiving portion which is adapted to receive a reflection of the first light signal. A second transceiver assembly has a transmitting portion which is adapted to deliver a second light signal having a central axis, and has a receiving portion which is adapted to receive a reflection of the second light signal. A first pivotal connecting device pivotally connects the first transceiver assembly to the frame at a first location adjacent the frame end portion for pivotal movement about a first axis, and a second pivotal connecting device pivotally connects the second transceiver assembly to the frame at a second location adjacent the frame end portion and frame second side for pivotal movement about a second axis. A powering device reciprocally moves the first transceiver assembly about the first axis between a first position at which the first light signal central axis extends outwardly from the frame end portion at a diverging angle "A" relative to a plane lying along and extending elevationally from the longitudinal vehicle axis, and a second position angularly spaced from the first position at which the first light signal central axis extends outwardly from the frame end portion at a converging angle "B" relative to the plane lying along and extending elevationally from the longitudinal vehicle axis. A tie device connects the first transceiver assembly to the second transceiver assembly and reciprocally moves the second transceiver assembly about the second axis between a third position at which the second light signal central axis extends in an outwardly direction from and relative to the frame end portion at a converging angle "C" relative to said plane lying along and extending elevationally from the longitudinal vehicle axis, and a fourth position angularly spaced from the third position at which the first light signal central axis extends in an outwardly direction from and relative to the frame end portion at a diverging angle "D" relative to the plane lying along and extending elevationally from the longitudinal axis.

In another aspect of the present invention, a material handling vehicle has a frame which has an end portion, opposed first and second spaced apart sides connected to the end portion, and a longitudinal vehicle axis extending along the frame and passing through the end portion. A first shaft is connected to the frame at a first location adjacent the end portion and first side of the frame, and a second shaft is connected to the frame at a second location adjacent the second end portion and second side of the frame. A first bracket has a base portion and a first arm portion which is connected to extend from the first bracket base portion, and a second bracket has a base portion and a first arm portion which is connected to extend from the second bracket base portion. First and second transceiver assemblies each have a light signal transmitting portion and a reflected light receiving portion. The first transceiver assembly light transmitting portion is adapted to deliver a first light signal having a central axis, and the first transceiver assembly light receiving portion is adapted to receive a reflection of the first light signal, and the second transceiver assembly light transmitting portion is adapted to deliver a second light signal having a central axis, and the second transceiver assembly light receiving portion is adapted to receive a reflection of the second light signal. An adjusting device pivotally connects the first transceiver assembly to the first bracket first arm portion and the second transceiver assembly to the second bracket first arm portion. The adjusting device maintains the first and second transceiver assemblies each at a selected one of a plurality of pivoted angular positions relative to a common plane passing substantially normally through the first and second shafts. A linkage arrangement connects a rotary output shaft of an electric motor to the first bracket and pivotally and reciprocally moves the first bracket about the first shaft between a first position at which the first light signal central axis projects outwardly from the first transceiver assembly at a diverging angle "A" relative to a plane lying along and extending vertically from the longitudinal vehicle axis, and a second position angularly spaced from the first position at which the first light signal central axis extends outwardly from the second transceiver assembly at a converging angle "B" relative to the plane lying along and extending vertically from the longitudinal vehicle axis. The first bracket is pivotally movable between the first and second positions in response to rotary movement of the output shaft. A tie rod is pivotally connected to and between the first and second brackets and is adapted to pivotally move the second bracket about the second shaft between a third position and a fourth position angularly spaced from the third position in response to pivotal movement of the first bracket between the first position and the second position. The second light signal central axis projects outwardly from the second transceiver assembly at a converging angle "C" relative to the plane lying along and extending vertically from the longitudinal vehicle axis at the third position, and the second light signal central axis projects outwardly from the second transceiver assembly at a diverging angle "D" relative to the plane lying along and extending vertically from the longitudinal vehicle axis at the fourth position.

BRIEF DESCRIPTION OF THE DRAWINGS

FIG. 2 is a partial enlarged diagrammatic isometric view of the oscillating scanner assembly of FIG. 1 showing the first and second transceiver assemblies, first and second means for pivotally connecting the first and second transceiver assemblies to the frame, a power means for reciprocally moving the first and second transceiver assemblies between spaced apart positions, and a tie means for connecting the first transceiver assembly to the second transceiver assembly;

FIG. 3 is a partial diagrammatic elevational view of the power means of FIG. 2 showing linkage means for connecting a rotary output shaft of a drive motor to a first shaft connected to the first transceiver assembly;

FIG. 4 is a top diagrammatic plan view of the oscillating scanner assembly of FIG. 2 showing the positions to which the first and second transceiver assemblies are pivotally movable about the first and second shafts, respectively, in phantom lines; and FIG. 5 is a diagrammatic partial side elevational view of the oscillating scanner assembly of FIG. 2 showing the second transceiver assembly and second adjustment means in greater detail, and the positions of maximum pivotal movement of the first and second transceiver assemblies in solid and phantom lines.

BEST MODE FOR CARRYING OUT THE INVENTION

Figure 1:
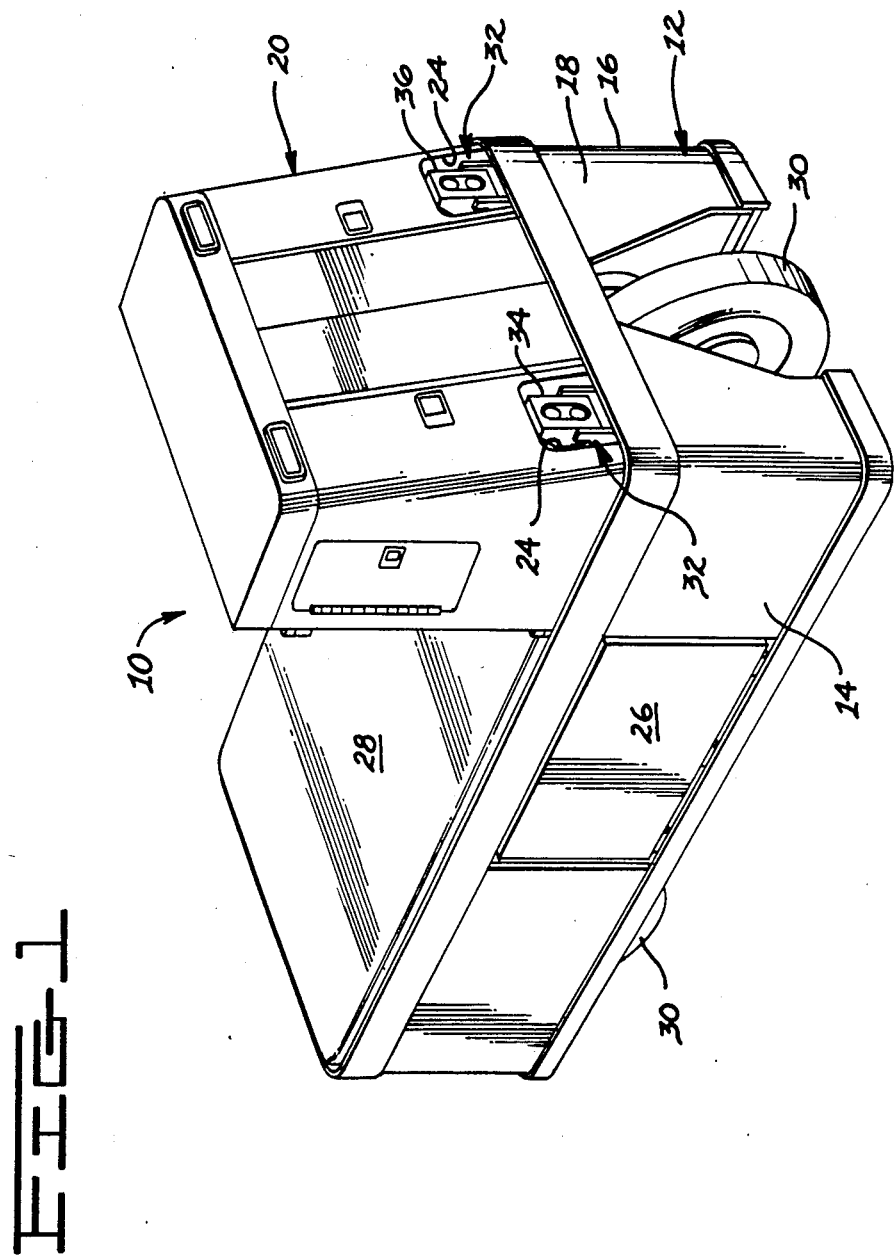
FIG. 1 is a diagrammatic isometric view of an embodiment of the present invention showing a work vehicle and, an oscillating scanner assembly having a frame and first and second transceiver assemblies pivotally mounted at spaced apart locations on the frame.

With reference to the drawings, a work vehicle 10 has a frame 12 which has first and second spaced apart sides 14,16, and an end portion 18. The first and second sides 14,16 are connected to the end portion 18 at spaced apart locations on the end portion and define a substantially rectangularly configured frame 12. A tower portion 20 which houses a controller (not shown) is connected adjacent the end portion 18 of the frame 12 and extends in an elevational direction upwardly from the frame 12. A pair of openings 24 is disposed in the tower at a location adjacent the end portion 18. Preferably, the openings 24 are each closely adjacent the first and second frame sides 14,16. A source of electrical energy 26, in the form of a storage battery, is provided for supplying electrical energy needs of the vehicle. A platform 28 or other load carrying implement, for example, a lift mast and the like (not shown), is connected to the frame 12 in any suitable manner. A plurality of vehicle wheels 30 enable the vehicle to be propelled over the ground in any conventional and suitable manner. Although the particular work vehicle shown is an AGV (automatic guided vehicle), it is to be understood that other types of work vehicles, manned or unmanned, are to be considered as suitable fields of equivalent use.

An oscillating scanner arrangement 32 having first and second spaced apart transceiver assemblies 34,36 is provided for identifying an object in the path of the work vehicle 10 and deliver a signal to the controller in response to positive identification of an object in the path of the work vehicle 10. The first transceiver assembly 34 is disposed in one of the openings 24, and the second transceiver assembly 36 is disposed in the other of the openings 24.

Referring to FIGS. 2 and 4, the first transceiver assembly 34 has a transmitting portion 38 and a receiving portion 40. The first transceiver transmitting portion is adapted to deliver a first light signal which has a central axis 42, and the first transceiver receiving portion 40 is adapted to receive a reflection of the first light signal. Similarly, the second transceiver assembly 36 has a transmitting portion 44 and a receiving portion 46. The second transceiver transmitting portion 44 is adapted to deliver a second light signal having a central axis 48. The second transceiver receiving portion 46 is adapted to receive a reflection of the second light signal. The first and second transceiver assemblies 34,36 preferably include Visolux, Model LT2000, Reflection Light Scanners. These scanners are self contained, focused beam, photoelectric controls which will detect all objects, regardless of texture and color, within the scanning field. Objects in the background, beyond the upper scanning limits of the device, will not be detected. The unit utilizes an LED to transmit a visible beam of modulated Infra-Red light at the object to be detected. Provided the object is within the scanning field, the receiver system will detect the light reflected from it.

A first means 50 (FIG. 3) is provided for pivotally connecting the first transceiver assembly 34 to the frame 12 at a first location adjacent the frame end portion 18 and the frame first side 14. The first means 50 preferably includes a first bracket 52 and a first shaft 54 which is rigidly connected to the first bracket, for example, by splines or a tapered portion on shaft 54. The first shaft 54 is pivotally connected to the frame 12 at the first location and defines a first axis 56. The first transceiver assembly 34 is mounted on the first bracket 52 and pivotally movable about the first axis 56.

A second means 58 is provided for pivotally connecting the second transceiver assembly 36 to the frame 12 at a second location spaced from the first location and adjacent the frame end portion 18 and the frame second side 16. The second means 58 preferably includes a second bracket 60 and second shaft 62 which is securely connected to the second bracket 60, for example, by splines or tapered portion on shaft 62. The second transceiver assembly 36 is mounted on the second bracket 60 and pivotally movable about a second axis 64. The first and second axis 56 and 64 of the first and second shafts 54 and 62, respectively, are parallel to one another and extend in an elevational direction from a support member 68 which is connected to the frame 12. Preferably, the first and second shafts 54,62 are normal to surface 66 of support member 68.

Referring to FIGS. 2 and 4, a power means 70 is provided for reciprocally moving the first transceiver assembly 34 about the first axis 56 between a first position 72 at which the first light signal central axis extends outwardly from the frame end portion 18 at a diverging angle "A" of approximately 34 degrees relative to a plane 74 lying along, passing through, and extending elevationally from a longitudinal vehicle axis 76, and a second position 78 angularly spaced from the first position 72 at which the first light signal central axis 42 extends outwardly from the frame end portion 18 at a converging angle "B" of approximately 34 degrees relative to plane 74. A tie means 80 connects the first transceiver assembly 34 to the second transceiver assembly 36 and reciprocally moves the second transceiver assembly 36 about the second axis 64 between a third position 82 at which the second light signal central axis 48 extends in an outward direction from and relative to the frame end portion 18 and at a converging angle "C" at approximately 34 degrees relative to plane 74, and a fourth position 84 angularly spaced from the third position 82 at which the second light signal central axis 48 extends outwardly from the frame end portion at a diverging angle "D" of approximately 34 degrees relative to plane 74. Surface 66 of support member 68 is preferably normal to plane 74 and parallel to longitudinal axis 76.

An adjusting means 86 (FIGS. 2 and 5) pivotally connects the first transceiver assembly 34 to the first bracket 52 and the second transceiver assembly 36 to the second bracket 60 and maintains the first and second transceiver assemblies 34,36 each at a selected one of a plurality of pivoted angular positions relative to a plane 88 passing substantially normally through each of the first and second shafts 54,62. The plane 88 is parallel to the surface 66 of support member 68 and normal to plane 74 which passes through the vehicle axis. The first bracket 52 has a base portion 90 and first and second spaced apart arm portions 92,94 connected to the base portion 90 at spaced apart locations and extends from the base portion 90 in preferably an elevational direction. Likewise, the second bracket 60 has a base portion 96 and first and second spaced apart arm portions 98,100 which are connected to the base portion 96 at spaced apart locations thereon and which extend therefrom in preferably an elevational direction. The base portion 90 is connected to the first shaft 54, and the base portion 96 is connected to the second shaft 62.

Adjusting means 86 includes first and second adjustment means 102,104. The first adjustment means 102 pivotally connects the first transceiver assembly to the support member 68 and maintains the first transceiver at the selected one of a plurality of angular locations relative to and spaced from the support member surface 66, and the second adjustment means 104 pivotally connects the second transceiver assembly 36 to the support member 68 and maintains the second transceiver assembly 36 at a selected one of a plurality of angular locations relative to and spaced from the support member surface 66. Specifically, the first adjustment means 102 includes a first cross shaft 106 which pivotally connects the first transceiver assembly 34 to the first and second arm portions 92,94 of the first bracket 52, a first arcuate slot 108 disposed in the first arm portion 92 and a third arcuate slot 110 disposed in the second arm portion 94. A first fastener 112 is connected to the first transceiver assembly 34, disposed in the first arcuate slot 108, and forcibly engageable with the first arm portion 92, and a third fastener 114 is connected to the first transceiver assembly 34, disposed in the third arcuate slot 110, and forcibly engageable with the second arm portion 94 of the first bracket 52. It is to be noted that the arcuate slots 108,110 are defined by a radius pivoted about an axis of the first cross shaft 106. The first and second arcuate slots 108,110 each have a branch slot 116 extending therefrom to permit disengagement of the first transceiver assembly 34 from connection with the first bracket 52.

The second adjustment means 104 includes a second cross shaft 118 which pivotally connects the second transceiver assembly 36 to the first and second arm portions 98,100 of the second bracket 60, a second arcuate slot 120 disposed in the first arm portion 98 of the second bracket 60 and a fourth arcuate slot 122 disposed in the second arm portion 100 of second bracket 60. A second fastener 124 is connected to the second transceiver assembly 36, disposed in the second arcuate slot 120, and forcibly clampingly engageable with the first arm portion 98, and a fourth fastener 126 connected to the second transceiver assembly 36, disposed in the second arcuate slot 120, and forcibly clampingly engageable with the second arm portion 100 of the second bracket 60. Branch slot 116 is also provided in the first and second arm portions 98,100 of the second bracket 60 to permit removal of the second transceiver assembly 36 from connection with the second bracket 60.

Referring to FIGS. 2 and 5, a first housing 128 is provided to connect the first transceiver assembly 34 to the first bracket 52, and a second housing 130 is provided for connecting the second transceiver assembly 36 to the second bracket 60. The first housing 128 has an opening 132 of preferably an elongate configuration disposed therein, and a pair of projections 134 extending from the housing in a common direction. The first transceiver assembly 34 is disposed in and connected to the first housing, and the first transceiver transmitting and receiving portions 38,40 are disposed in the opening 132 and adapted to pass and receive light therethrough. The second housing 130 similarly has an opening 136 of preferably an elongate configuration disposed therein, and a pair of projections 138 connected to and extending from the housing in a common direction. The second transceiver assembly 36 is disposed in and connected to the second housing 130 in any suitable manner. The second transceiver transmitting and receiving portions 44,46 are disposed in the opening and adapted to pass and receive light therethrough. The first cross shaft 106 is connected to the pair of projections 134 of the first housing 128, and the second cross shaft 118 is connected to the pair of projections 138 of the second housing 130. The projections 134,138 are pivotally movable about the first and second cross shafts 106,118, respectively.

The first and third fasteners 112,114 are connected in any suitable manner to the first housing 128 at spaced apart locations on the housing 128 and project from the housing 128 in opposed directions so that they may be positioned in the first and third arcuate slots 108,110, respectively. Similarly, the second and fourth fasteners 124,126 are connected to the second housing 130 at spaced apart locations on the housing 130 and extend from the second housing 130 in opposite directions so that they may be disposed in the second and fourth arcuate slots 120,122, respectively. The first and second housings 128,130 have a channel shaped configuration, and the fasteners extend from opposed sides of the channel member. Each of the fasteners 112,114,124,126 have a nut 140 screwthreadably connected thereto and adapted to forcibly engage the respectively adjacent arm portions 92,94,98,100 of the first and second brackets 52,60 and clampingly engage the arm portions 92,94,98,100 against the respective first and second housings 128,130. Thus, it can be seen that the first adjusting means 102 maintains the first transceiver assembly 34 at a selected one of a plurality of pivoted angular positions relative to and in a plane normal to the plane 88, and the second adjustment means 104 maintains the second transceiver assembly 36 at a selected one of a plurality of pivoted angular positions relative to and in a plane normal to plane 88. The first and second cross shafts 106,118 are preferably parallel to plane 88, and the projections 134,138 of the first and second housings 130,132, respectively, are perpendicular to the first and second cross shafts 106,118, respectively.

The tie means 80, as best shown in FIG. 2, includes a tie rod 142 having first and second spaced apart end portions 144,146, a first lever arm 148 connected to and extending from the first bracket 52 at the base portion 90, and a second lever arm 150 connected to and extending from the base portion 96 of the second bracket 60. A fastener 152 of any suitable configuration pivotally connects each of the first and second spaced apart end portions 144,146 to the first and second lever arms 148,150, respectively. Although the lever arms 148,150 are shown as integral parts of the first and second brackets 52,60, other configurations to achieve equivalent results are contemplated and within the scope of the invention. The tie rod 142 is adapted to pivotally move the second bracket 60 about the second axis 64 between the heretofore mentioned third and fourth positions 82,84 in response to pivotal movement of the first bracket between the first position 72 and the second position 78. The second bracket 60 is preferably at the third position 82 in response to the first bracket 52 being at the first position 72, and the second bracket 60 is at the fourth position 84 in response to the first bracket 52 being at the second position 78.

Referring to FIGS. 2 and 3, the power means 70 includes an electric motor 154 drivingly connected to a rotary output shaft 156, such as by a transmission 157. Linkage means 158 connects the rotary output shaft 156 to first bracket 52 and pivotally and reciprocally moves the first bracket 52 about the first axis 56 between said first and second positions 72,78 in response to rotary motion of output shaft 156.

The linkage means 158 includes a first link 160 having first and second spaced apart end portions 162,164, a second link 166 having first and second spaced apart end portions 168,170, and a third link 172 having first and second spaced apart end portions 174,176. The first link first end portion 162 is connected to the rotary output shaft and rotatable with the rotary output shaft 156. The second link second end portion 170 is connected to the first shaft 54 and rotatable with the first shaft 54. The third link first end portion 174 is pivotally connected to the first link second end portion 164, and the third link second end portion 176 is pivotally connected to the second link first end portion 168. Each of these pivotal connections are made in any suitable and conventional manner such as by a pivot pin of wellknown construction. Power means 70 is secured to the vehicle frame 12 at a location adjacent the first shaft 54 so that the length of the second and third links 160,166,172 is kept to a minimum. Preferably, the power means 70 is removably secured to the vehicle frame 12 via threaded fasteners. The support member 68 is preferably first and second spaced apart gussets 178,180. The first gusset 178 is connected, such as by welding, to the frame first side 14 and frame end portion 18, and the second gusset 180 is connected, such as by welding, to the frame second side 16 and frame end portion 18. The first shaft 54 is rotatably connected relative to the first gusset 178, and the second shaft 62 is rotatably connected relative to the second gusset 180.

The first transceiver transmitting portion 38 is elevationally spaced from the first transceiver receiving portion 40, and the second transceiver transmitting portion 44 is spaced elevationally from the second transceiver receiving portion 46. Because the first and second transceiver assemblies pivotally move about the first and second axes 56,64, it is important that the transmitting and receiving portions lie above one another so that there will be no false signals due to either a lag or a lead of the reflective light beam caused by this motion. Although not shown, the first and second transceiver assemblies 34,36 and the electric motor 154 are connected to the source of electrical energy 26 in a manner as to provide power for operation thereof.

Industrial Applicability

With reference to the drawings, the oscillating scanner arrangement 32 provides a unique, low cost, efficient, and highly accurate way of detecting objects in the path of movement of vehicle 10. In operation, electrical current is delivered from the battery 26 to the first and second transceiver assemblies 34,36 and electric motor 154. This current causes the transmitting portions 38,44 to deliver a light signal, having an intense beam of narrow width, from the vehicle 10 in a direction substantially in the path of movement of the vehicle 10. The electrical current also activates the receiving portions 40,46 of the first and second transceiver assemblies 34,36 and conditions the transceiver assemblies to deliver a signal in response to the receiving portions 40,46 being turned on by the reflected light. The electric motor 154 is responsive to the controller, not shown to rotate output shaft 156 at a preselected speed. The speed of rotation of the motor is selected as a function of the width of the vehicle, the speed of the vehicle, and the scanning range of the first and second transceiver assembly 34,36. The desired range of the light signal for a typical AGV application is in the vicinity of two meters (6.5 feet).

Rotation of output shaft 156 is converted to reciprocating or oscillating motion and delivered to the first shaft 54 by linkage means 158. Because the first shaft 54 is connected to the rotary output shaft 156 by links 160,166,172, reciprocating motion of the first shaft 54 will be limited to a preselected amount of angular rotation established by the relative lengths of the first and second links 160,166. Preferably, the amount of rotation of the first shaft 54 will enable the light beam of a first transceiver assembly 34 to cover a range of pivotal motion equal to at least one half the distance between the first and second sides 14,16 of frame 12 within the scanning range of the light beam.

As the first transceiver assembly 34 pivots about the first axis 56 between the first and second positions 72,78, the tie means 80 moves the second transceiver assembly 36 about the second axis 64 between the third and fourth positions 82,84. The angle of pivotal movement selected between the third and fourth positions 82 and 84 will enable the light beam of the second transceiver assembly 36 to cover at least one half the distance between the first and second sides 14 and 16. Therefore, the entire width of the vehicle is scanned in the path of the vehicle 10 from side to side of the vehicle 10.

The adjusting means 86 enables the first and second transceiver assemblies 34,36 to be aligned so that the central axis 42 of the first light signal and the central axis 48 of the second light signal are directed at substantially the same elevationally oriented angle relative to plane 88. Preferably, the first and second transceiver assemblies will be at an elevationally oriented angle relative to plane 88 at which the light signals will be able to identify an object in the path of the vehicle of various sizes and locations relative to the surface on which the vehicle operates. Theoretically, central axis 42 and 48 should be directed at an imaginary target having a minimum height of 152.4 mm, (0.5 ft) at the maximum scanning range of approximately two meters (6.5 feet) from the transceiver assemblies 34,36. To align the assemblies, one must first release the first, second, third, and fourth fasteners 112,114,124,126 and pivot the first and second transceiver assemblies about the cross shafts 106,118 until the desired positions are obtained. Nuts 140 are then screw threadably rotated into engagement with the first and second brackets 52,60. The transceivers as a result are retained by the clamping force of the nuts 140 against the brackets 52,60.

The tie means 80 not only transfers oscillating motion from the first transceiver assembly 34 to the second transceiver assembly 36 but also provides for a limited amount of adjustment so that the central axes 42 and 48 are parallel to each other. The adjustment is made at the first and second end portions 144,146 of the tie rod 142 through fastener 152 which pivotally connects the first and second lever arms 148,150 to the tie rod 142.

As vehicle 10 traverses the underlying surface, the first and second transceiver assemblies 34,36 sweep about the first and second axes 56,64 between the first and second positions 72,78 and third and fourth positions 82,84 in response to rotary motion of the output shaft 156. Objects in the path of the vehicle will reflect the light signals directed by the first and second transmitting portions 38,44 back to the respective ones of the first and second receiving portions 40,44. Upon receipt of the reflected signal, the first and second transceiver assemblies 34,36 will deliver a control signal to a control unit (not shown) which will cause the vehicle to take further action. Such action includes, for example, a reduction in the speed of the vehicle followed by vehicle braking.

It should be noted that the second transceiver assembly 36 is at the third position 82 when the first transceiver assembly 34 is at the first position 72, and at the fourth position 84 when the first transceiver assembly 34 is at the second position 78. This motion enables the vehicle to ensure that the full field in front of the vehicle is scanned. Because the oscillating scanner arrangement 32 utilizes light emitting transceivers with relatively narrow width beams of relatively high intensity, the problems heretofore mentioned have been eliminated. By oscillating the transceivers 34,36, it is possible to fully cover the path of travel of the vehicle 10 without requiring additional transceiver assemblies, thus making usage feasible from a cost and space standpoint.

Other aspects, objects, and advantages of this invention can be obtained from a study of the drawings, the disclosure, and the appended claims.

We claim:

1. A work vehicle, comprising:

a frame having an end portion, first and second spaced apart sides, each connected to said end portion, and a longitudinal vehicle axis;

first and second transceiver assemblies each having a transmitting portion and a receiving portion, said first transceiver assembly transmitting portion being adapted to deliver a first light signal having a central axis and said first transceiver assembly receiving portion being adapted to receive a reflection of said first light signal, and said second transceiver assembly transmitting portion being adapted to deliver a second light signal having a central axis and said second transceiver assembly receiving portion being adapted to receive a reflection of said second light signal;

first means for pivotally connecting the first transceiver assembly to the frame at a first location adjacent the frame end portion and frame first side, said first means defining a first axis about which said first transceiver assembly is pivotally movable;

second means for pivotally connecting the second transceiver assembly to the frame at a second location adjacent the frame end portion and frame second side, said second means defining a second axis about which said second transceiver assembly is pivotally movable;

power means for reciprocally moving said first transceiver assembly about said first axis between a first position at which said first light signal central axis extends outwardly from the frame end portion at a diverging angle "A" relative to a plane lying along and extending elevationally from the longitudinal vehicle axis, and a second position angularly spaced from said first position at which said first light signal central axis extends outwardly from the frame end portion at a converging angle "B" relative to said plane lying along and extending elevationally from the longitudinal vehicle axis; and tie means for connecting said first transceiver assembly to said second transceiver assembly and reciprocally moving said second transceiver assembly about said second axis between a third position, at which the second light signal central axis extends in an outwardly direction from and relative to the frame end protion and at a converging angle "C"

relative to said plane lying along and extending elevationally from the longitudinal vehicle axis, and a fourth position angularly spaced from said third position, at which said first light signal central axis extends in an outwardly direction from and relative to the frame end portion and at a diverging angle "D" relative to said plane lying along and extending elevationally from said longitudinal axis, said frame including:
- a support member having a surface, said support member being connected to said frame and said support member surface being positioned normal to the elevationally oriented plane and parallel to the longitudinal frame axis, and including:
- a first adjustment means for pivotally connecting said first transceiver assembly to said support member and maintaining said first transceiver assembly at a selected one of a plurality of angular locations relative to and spaced from the support member surface; and
- a second adjustment means for pivotally connecting said second transceiver assembly to said support member and maintaining said second transceiver assembly at a selected one of a plurality of angular locations relative to and spaced from the support member surface.

2. A work vehicle, as set forth in claim 1, wherein said first means includes a first bracket and a first shaft, and said second means includes a second bracket and a second shaft, said first shaft being connected to said first bracket and said second shaft being connected to said second bracket, said first shaft being parallel to said second shaft and said first and second shafts each extending in an elevational direction from the support member.

3. A work vehicle, as set forth in claim 2, wherein said first adjustment means includes:
- a first cross shaft pivotally connecting said first transceiver assembly to the first bracket;
- a first arcuate slot disposed in the first bracket;
- a first fastener connected to the first transceiver assembly, disposed in the first arcuate slot, and forceably engageable with the first bracket, and wherein said second adjustment means includes:
- a second cross shaft pivotally connecting said second transceiver assembly to the second bracket;
- a second arcuate slot disposed in the second bracket; and
- a second fastener connected to the second transceiver assembly, disposed in the second arcuate slot, and forceably clampingly engageable with the second bracket.

4. A work vehicle, as set forth in claim 1, wherein said support member includes first and second gussets, said first gusset being connected to said frame first side and said frame end portion and said second gusset being connected to said frame second side and said frame end portion.

5. A work vehicle, as set forth in claim 3, wherein said first bracket includes:
- a base portion and a first arm portion, said first bracket base portion being connected to the first shaft, said first cross shaft being connected to the first bracket first arm portion, and said first arcuate slot being disposed in the first bracket first arm portion, and wherein said second bracket includes:
- a base portion and a first arm portion, said second bracket base portion being connected to the second shaft, said second cross shaft being connected to the second bracket first arm portion and said second arcuate slot being disposed in the second bracket first arm portion.

6. A work vehicle, as set forth in claim 2, wherein said first shaft is rotatable relative to said support member, and said second shaft is fixed relative to one of said support member and said second bracket.

7. A work vehicle, as set forth in claim 2, wherein said tie means includes:
- lever arm connected to and extending from said first bracket;
- a second lever arm connected to and extending from said second bracket;
- a tie rod having first and second spaced apart end portions; and
- a fastener pivotally connecting each of said first and second spaced apart end portions of the tie rod to said first and second lever arms, respectively.

8. A work vehicle, as set forth in claim 2, wherein said power means includes:
- an electric motor having a rotary output shaft;
- a first link having first and second spaced apart end portions and being connected at the first end portion to the rotary output shaft and rotatable with said rotary output shaft;
- a second link having first and second spaced apart end portions and being connected at the second link second end portion to the first shaft and rotatable with said first shaft; and
- a third link having first and second spaced apart end portions and being pivotally connected at the third link first end portion to the first link second end portion, and pivotally connected at the third link second end portion to the second link first end portion.

9. A material handling vehicle, comprising:
- a frame having an end portion, opposed first and second spaced apart sides connected to said end portion, and a longitudinal vehicle axis extending along said frame and passing through said end portion;
- a first shaft connected to said frame at a first location adjacent the end portion and first side of said frame;
- a first bracket having a base portion and a first arm portion, said first bracket first arm portion being connected to and extending from said first bracket base portion, and said first bracket base portion being connected to said first shaft;
- a second shaft connected to said frame at a second location adjacent the end portion and second frame side;
- a second bracket having a base portion and a first arm portion, said second bracket first arm portion being connected to and extending from the second bracket base portion;
- first and second transceiver assemblies each having a light signal transmitting portion and a reflected light receiving portion, said first transceiver assembly light transmitting portion being adapted to deliver a first light signal having a central axis and said first transceiver assembly light receiving portion being adapted to receive a reflection of said first light signal, and said second transceiver assembly light transmitting portion being adapted to deliver a second light signal having a central axis and said second transceiver assembly light receiving portion being adapted to receive a reflection of said second light signal, said first transceiver transmitting portion being spaced elevationally from the first transceiver receiving portion and said second transceiver transmitting portion being spaced elevationally from the second transceiver receiving portion;

a first housing having an opening disposed therein and a pair of projections extending from said housing in a common direction, said first transceiver assembly being disposed in and connected to the first housing, and said first transceiver transmitting and receiving portions being disposed in sasid opening and adapted to pass and receive light therethrough;

a second housing having an opening disposed therein and a pair of projections extending from said second housing in a common direction, said second transceiver assembly being disposed in and connected to the second housing, and said second transceiver transmitting and receiving portions being disposed in said second housing opening and adapted to pass and receive light therethrough;

adjusting means for pivotally connected said first transceiver assembly to said first bracket first arm portion and said second transceiver assembly to said second bracket first arm portion, and maintaining said first and second transceiver assemblies each at a selected one of a plurality of pivoted angular positions relative to a plane passing substantially normally through the first and second shafts, said adjusting means pivotally connecting the pair of first housing projections to the first bracket first arm portion and said pair of second housing projections to the second bracket first arm portion;

an electric motor having a rotary output shaft;

linkage for connecting the rotary output shaft to the first bracket and pivotally and reciprocally moving the first bracket about the first axis between a first position, at which said first light signal central axis projects outwardly from the first transceiver assembly at a diverging angle "A" relative to a plane lying along and extending vertically from the longitudinal vehicle axis and a second position angularly spaced from said first position, at which said first light signal central axis extends outwardly from the first transceiver assembly at a converging angle "B" relative to said plane lying along and extending vertically from the longitudinal vehicle axis, said first bracket being pivotally movable between said first and second positions in response to rotary movement of said output shaft; and a tie rod pivotally connected to and between the first and second brackets, said tie rod being adapted to pivotally move said second bracket about said second shaft between a third position and a fourth position angularly spaced from said third position in response to pivotal movement of said first bracket between said first position and said second position, said second light signal central axis projecting outwardly from the second transceiver assembly at a converging angle "C" relative to said plane lying along and extending vertically from the longitudinal vehicle axis at the third position thereof, and said second light signal central axis projecting outwardly from the second transceiver assembly at a diverging angle "D" relative to said plane lying along and extending vertically from the longitudinal vehicle axis at the fourth position thereof, said second bracket being at the third position in response to the first bracket being at the first position and said second bracket being at the fourth position in response to said first bracket being at the second position.

10. A material handling vehicle, comprising:

a frame having an end portion, opposed first and second spaced apart sides connected to said end portion, and a longitudinal vehicle axis extending along said frame and passing through said end portion;

a first shaft connected to said frame at a first location adjacent the end portion and first side of said frame;

a first bracket having a base portion and a first arm portion, said first bracket first arm portion being connected to and extending from said first bracket base portion, and said first bracket base portion being connected to said first shaft;

a second shaft connected to said frame at a second location adjacent the end portion and second frame side;

a second bracket having a base portion and a first arm portion, said second bracket first arm portion being connected to and extending from the second bracket base portion;

first and second transceiver assemblies each having a light signal transmitting portion and a reflected light receiving portion, said first transceiver assembly light transmitting portion being adapted to deliver a first light signal having a central axis and said first transceiver assembly light receiving portion being adapted to receive a reflection of said first light signal, and said second transceiver assembly light transmitting portion being adapted to deliver a second light signal having a central axis and said second transceiver assembly light receiving portion being adapted to receive a reflection of said second light signal;

a first housing having a pair of projections extending in a common direction, said first transceiver assembly being connected to the first housing;

a second housing having a pair of projections extending in a common direction, said second transceiver assembly being connected to the second housing;

adjusting means for pivotally connecting said first transceiver assembly to said first bracket first arm portion and said second transceiver assembly to said second bracket first arm portion, and maintaining said first and second transceiver assemblies each at a selected one of a plurality of pivoted angular positions relative to a plane passing substantially normally through the first and second shafts;

an electric motor having a rotary output shaft;

linkage means for connecting the rotary output shaft to the first bracket and pivotally and reciprocally moving the first bracket about the first axis between a first position, at which said first light signal central axis projects outwardly from the first transceiver assembly at a diverging angle "A" relative to a plane lying along and extending vertically from the longitudinal vehicle axis and a second position angularly spaced from said first position, at which said first light signal central axis extends outwardly from the first transceiver assembly at a converging angle "B" relative to said plane lying along and extending vertically from the longitudinal vehicle axis, said first bracket being pivotally movable between said first and second positions in response to rotary movement of said output shaft;

a tie rod pivotally connected to and between the first and second brackets, said tie rod being adapted to pivotally move said second bracket about said second shaft between a third position and a fourth position angularly spaced from said third position in response to pivotal movement of said first bracket between said first position and said second position, said second light signal central axis projecting outwardly from the second transceiver assembly at a converging angle "C" relative to said plane lying along and extending from the longitudinal vehicle axis at the third position thereof, and said second light signal central axis projecting outwardly from the second transceiver assembly at a diverging angle "D" relative to said plane lying along and extending vertically form the longitudinal vehicle axis at the fourth position thereof, said second bracket being at the third position in response to the first bracket being at the first position and said second bracket being at the fourth position in response to said first bracket being at the second position, said adjusting means including;

a first cross shaft pivotally connecting said pair of first housing projections to said first bracket first arm portion;

a first arcuate slot disposed in said first bracket first arm portion;

a first fastener connected to said first housing and being disposed in said first arcuate slot, said first fastener clamping said first bracket first arm portion to said first housing and maintaining said first transceiver assembly at a selected one of said plurality of pivoted angular positions relative to and in a direction normal to said plane passing substantially normally through said first and second shafts;

a second cross shaft pivotally connecting said pair of second housing projections to said second bracket first arm portion;

a second arcuate slot disposed in the second bracket first arm portion; and a second fastener connected to said second housing and being disposed in said second arcuate slot, said second fastener clamping said second bracket first arm portion to said second housing and maintaining said second transceiver assembly at a selected one of said plurality of pivoted angular positions relative to and in a direction normal to said plane passing substantially normally through said first and second shafts.

11. A material handling vehicle, as set forth in claim 10, wherein said first and second cross shafts are substantially parallel to said plane passing substantially normally through said first and seoond shafts, and wherein said first and second brackets each include a second arm portion, said first bracket second arm portion being connected to the first bracket base portion at a location spaced from said first bracket first arm portion and extending from said first bracket base portion in a direction substantially parallel to said first bracket first arm portions, said second bracket second arm portion being connected to the second bracket base portion at a location spaced from said second bracket first arm portion and extending from said second bracket base portion in a direction substantially parallel to said second bracket first arm portion.

12. A material handling vehicle, as set forth in claim 11, wherein said first cross shaft is connected to the first and second arm portions of the first bracket, and the second cross shaft is connected to the first and second arm portions of the second bracket, and said adjusting means includes:

a third arcuate slot disposed in the second arm portion of the first bracket;

a third fastener connected to said first housing and being disposed in said third arcuate slot, said third fastener clamping said first bracket second arm portion to said first housing;

a fourth arcuate slot disposed in the second bracket second arm portion; and a fourth fastener connected to said second housing and being disposed in said fourth arcuate slot, said fourth fastener clamping said second bracket second arm portion to said second housing.

13. A material handling vehicle, as set forth in claim 10, wherein said linkage means includes:

a first link having first and second spaced apart end portions and being connected at the first end portion to the rotary output shaft and rotatable with said rotary output shaft;

a second link having first and second spaced apart end portions and being connected at the second link second end portion to the first shaft and rotatable with said first shaft; and a third link having first and second spaced apart end portions and being pivotally connected at the third link first end portion to the first link second end portion, and pivotally connected at the third link second end portion to the second link first end portion.

* * * * *

UNITED STATES PATENT AND TRADEMARK OFFICE
CERTIFICATE OF CORRECTION

PATENT NO. : 4,706,772

DATED : November 17, 1987

INVENTOR(S) : Ian J. Dawson et al.

It is certified that error appears in the above-identified patent and that said Letters Patent is hereby corrected as shown below:

In the claims:

Column 12, claim 7, line 11, insert --a first-- before "lever arm".

Column 13, claim 9, line 38, insert --means-- after "linkage".

Column 16, claim 11, line 13, delete "portions" and insert --portion--.

Signed and Sealed this

Tenth Day of May, 1988

Attest:

DONALD J. QUIGG

*Attesting Officer*  *Commissioner of Patents and Trademarks*